United States Patent [19]
Ishida

[11] Patent Number: 5,425,134
[45] Date of Patent: Jun. 13, 1995

[54] PRINT COLOR MATERIAL AMOUNT DETERMINING METHOD

[75] Inventor: Ro Ishida, Tokyo, Japan

[73] Assignee: Toyo Ink Manufacturing Co., Ltd., Tokyo, Japan

[21] Appl. No.: 268,021

[22] Filed: Jun. 29, 1994

[30] Foreign Application Priority Data

Jun. 30, 1993 [JP] Japan ................................. 5-160994

[51] Int. Cl.⁶ .............................................. G06F 15/00
[52] U.S. Cl. ..................................... 395/109; 358/529
[58] Field of Search ................ 395/109, 112, 164, 165, 395/166; 346/157; 355/326, 327, 278; 358/529, 500, 501, 502, 503, 504, 512, 515, 516, 517, 518, 519, 521, 523, 527, 530, 522

[56] References Cited

U.S. PATENT DOCUMENTS

| | | | |
|---|---|---|---|
| 5,121,196 | 6/1992 | Hung | 358/504 |
| 5,200,816 | 4/1993 | Rose | 358/518 |
| 5,305,119 | 4/1994 | Rolleston et al. | 358/523 |
| 5,315,380 | 5/1994 | Ingraham et al. | 358/500 |
| 5,315,415 | 5/1994 | Kawai et al. | 358/515 |
| 5,331,440 | 7/1994 | Kita et al. | 358/529 |
| 5,355,440 | 10/1994 | Sayanagi et al. | 395/109 |
| 5,357,354 | 10/1994 | Matsunawa et al. | 358/530 |

*Primary Examiner*—Mark R. Powell
*Assistant Examiner*—Dov Popovici
*Attorney, Agent, or Firm*—Ladas & Parry

[57] ABSTRACT

When colorimetric values defined in a uniform color space are supplied, a plurality of sets of the amounts of print color materials of cyan, magenta, and yellow are obtained on the basis of the colorimetric values and a plurality of amounts of print color material of black. The ranges of printable color materials are obtained from the plurality of sets of the amounts of color materials of cyan, magenta, and yellow. The common range of the amounts of black material is obtained, which can be used to print each color materials, cyan, magenta, and yellow to reproduce a color. The amount of print color material of black in the range of the amounts of print color material of black is determined on the basis of a predetermined coefficient n. The amounts of print color materials of cyan, magenta, and yellow are determined on the basis of the determined amount of print color material of black and the colorimetric values.

16 Claims, 6 Drawing Sheets

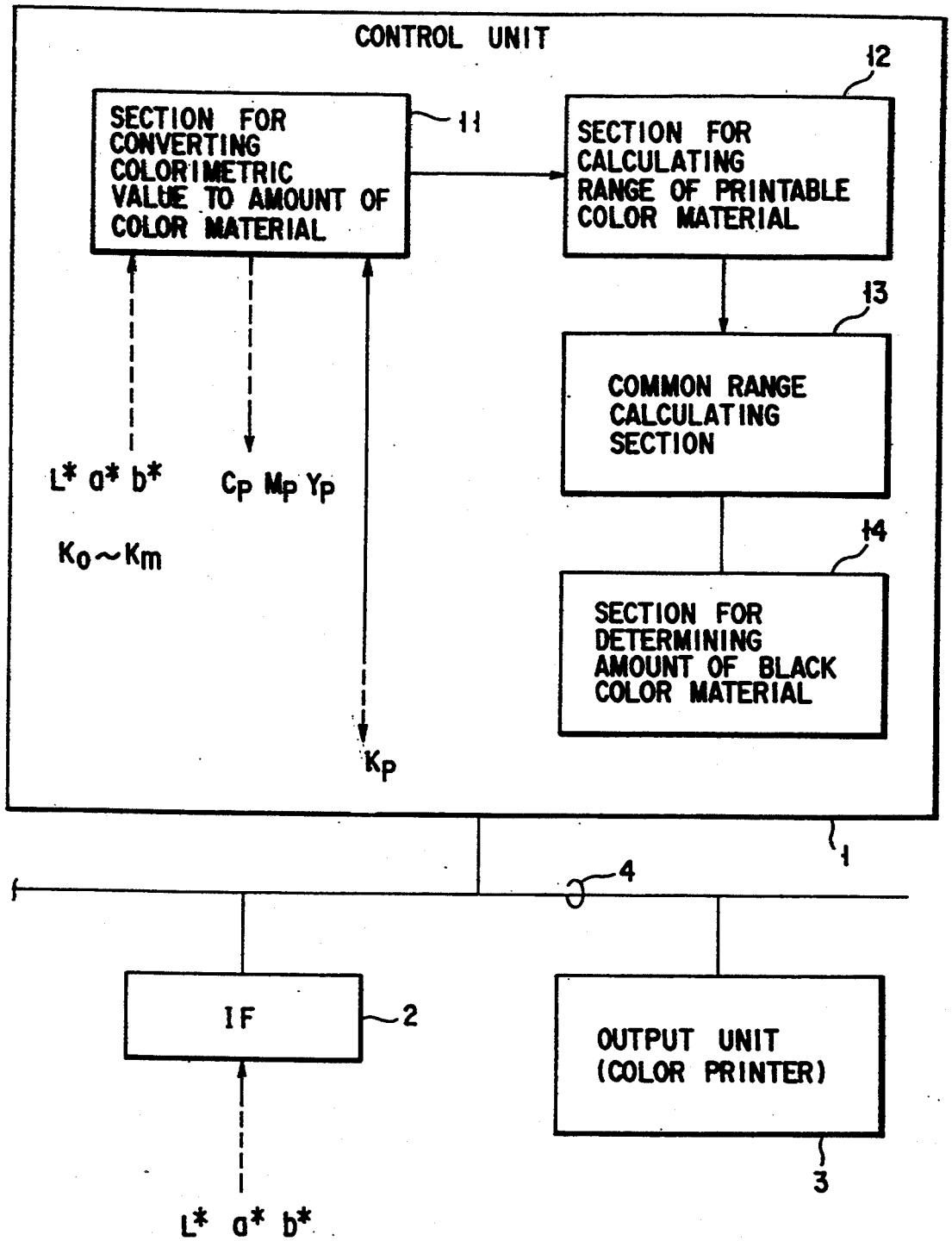
F I G. 1

FIG. 2

| L* | a* | b* | K (%) | C (%) | M (%) | Y (%) |
|---|---|---|---|---|---|---|
| 0 | -100 | -100 | 0 | $c_0$ | $m_0$ | $y_0$ |
| 0 | -100 | -100 | 10 | $c_1$ | $m_1$ | $y_1$ |
| ... | ... | ... | ... | ... | ... | ... |
| 0 | -100 | -100 | 100 | $c_{11}$ | $m_{11}$ | $y_{11}$ |
| 0 | -100 | -90 | 0 | $c_{12}$ | $m_{12}$ | $y_{12}$ |
| ... | ... | ... | ... | ... | ... | ... |
| 0 | -100 | -80 | 0 | $c_{22}$ | $m_{22}$ | $y_{22}$ |
| 0 | -100 | -80 | 10 | $c_{23}$ | $m_{23}$ | $y_{23}$ |
| ... | ... | ... | ... | ... | ... | ... |
| 100 | 100 | 100 | 100 | $c_{53361}$ | $m_{53361}$ | $y_{53361}$ |

PRINT COLOR MATERIAL AMOUNT DETERMINING METHOD

BACKGROUND OF THE INVENTION

1. Field of the Invention

The present invention relates to a print color material amount determining method for an image binarization apparatus used to output a color image in a color printing press, a color printer, a color copying machine, a color facsimile system, and the like and, more particularly, to a method of determining the amounts of print color materials including a black color material from information recorded by color representation based on a uniform color space.

2. Description of the Related Art

In a conventional color printing scheme, a conventional color printer, and the like, three small dots of three colors, i.e., cyan (C), magenta (M), and yellow (Y), or four small dots including a dot of black (K) are superposed on each other by a stochastic method, and an arbitrary color is generated as the average of these colors. In an image editing apparatus used in such a field of printing techniques, values proportional to the dot areas of C, M, Y, and K are used as values representing colors. In general, these CMY values or CMYK values can be obtained by a color scanner for printing.

In recent years, a color printer, a color copying machine, or the like is sometimes connected to an image editing apparatus to obtain a proof for checking the colors of reproduced images. Such image reproduction mechanisms are based on various printing schemes such as electrophotography, a dye diffusion thermal transfer scheme, and an ink-jet printing scheme. Color materials used for an image reproduction mechanism include various types of pigments and dyes.

In general, an output unit used for such an image reproduction mechanism is designed to receive CMY values, CMYK values, or RGB (red, green, and blue) signals and reproduce an image on the basis of these values. However, such CMY values, CMYK values, and RGB values are dependent on the type of unit. For this reason, an image reproduced by the output unit of this image reproduction mechanism is affected by the above printing scheme employed by the image reproduction mechanism and the type of pigment or dye used in the image reproduction mechanism. That is, even if signals (CMY values, CMYK values, or RGB values) of the same values are input to output units, the colors of reproduced images differ from each other depending on the types of output units or the types of color materials used. Therefore, it is difficult to obtain the same colors on printed matters by simply transferring RGB values, obtained by subtracting CMY values from the maximum values, to output units such as a color printer and a color copying machine, because of the above-described differences in the types of image reproduction mechanisms and color materials.

In order to solve such a problem, values independent of the characteristics of an output unit may be used as color representation values instead of the above CMYK values. For example, values based on the CIE L*u*v* system and the CIE L*a*b* system as uniform color spaces which are the color systems specified by Commission Internationale de l'Eclairage (CIE) are values independent of the characteristics of an output unit. Therefore, values independent of the characteristics of an output unit, e.g., CIE L*a*b values, are used in an image editing apparatus. When values are to be output to various types of output units, CIE L*a*b* values are converted into CMY values, CMYK values, or RGB values representing the amounts of print color materials which are independent of the characteristics of the respective output units.

As methods of converting CIE L*a*b* values or CIE L*u*v* values into CMY values or RGB values representing the amounts of color materials which are independent of the characteristics of the respective output units, a least squares method, an interpolated look-up table (LUT) method, and a method using a neural network are known.

In general, CIE L*a*b* or CIE L*u*v values based on uniform color spaces are three-dimensional information, whereas CMYK values are four-dimensional information. For this reason, it is difficult to convert CIE L*a*b* or CIE L*u*v values into CMYK values as four-dimensional information, although these values can be converted into three-dimensional information such as CMY or RGB values by using the least squares method, the interpolated look-up table method, the neural network method, or the like.

SUMMARY OF THE INVENTION

It is an object of the present invention to provide a method of determining proper amounts of color materials suitable for faithful image reproduction by converting three-dimensional colorimetric value information of uniform three-dimensional color space into four-dimensional CMYK values which are independent of the characteristics of an output unit.

In order to achieve the above object, according to the first aspect of the present invention, there is provided a method of converting colorimetric values defined in a uniform color space into the amounts of print color materials of cyan, magenta, yellow, and black, comprising the steps of a) converting the m ($1<m$) set of amounts of black color material and the colorimetric values to m sets of print color materials of cyan, magenta, and yellow, amounts of print color material of black being predetermined, b) calculating a range of print color material of each of cyan, magenta, and yellow in which the amount of print color material of each of cyan, magenta, and yellow is not less than 0% and not more than 100%, on the basis of the m sets of print color materials of cyan, magenta, and yellow obtained in the step a), c) obtaining a common range of the amounts of print color material of black from the range of print color material of each of cyan, magenta, and yellow calculated in the step b), d) multiplying a maximum value in the common range of the amounts of print color material of black by a predetermined coefficient n ($0 \leq n \leq 1$), determining the product as the amount of print color material of black if the product is larger than a minimum value in the range of the amounts of print color material of black, and determining the minimum value as the amount of print color material of black if the product is smaller than the minimum value, and e) converting the amount of print color material of black obtained in the step d) and the colorimetric values into the amounts of print color materials of cyan, magenta, and yellow, and determining the obtained amounts of color materials of the respective colors as the amounts of print color materials of cyan, magenta, and yellow.

According to the second aspect of the present invention, there is provided a print color material amount determining method used for an image reproduction system, having an output unit for outputting colors on the basis of the amounts of print color materials of cyan, magenta, yellow, and black and conversion means for converting colorimetric values defined in a uniform color space and the amounts of print color material of black into the amounts of print color materials of cyan, magenta, and yellow, for reproducing colors represented by the colorimetric values by using the output unit, comprising the steps of a) obtaining m sets of print color materials of cyan, magenta, and yellow by using the conversion means on the basis of predetermined m ($1 < m$) amounts of print color material of black in response to input of colorimetric values to the image reproduction system, b) calculating a range of print color material of each of cyan, magenta, and yellow in which the amount of print color material of each of cyan, magenta, and yellow is not less than 0% and not more than 100%, on the basis of the m sets of print color materials of cyan, magenta, and yellow obtained in the step a), c) obtaining a common range of the amounts of print color material of black from the range of print color material of each of cyan, magenta, and yellow calculated in the step b), d) multiplying a maximum value in the common range of the amounts of print color material of black by a predetermined coefficient n ($0 \leq n \leq 1$), determining the product as the amount of print color material of black if the product is larger than a minimum value in the range of the amounts of print color material of black, and determining the minimum value as the amount of print color material of black if the product is smaller than the minimum value, and e) obtaining the amounts of print color materials of cyan, magenta, and yellow by using the conversion means on the basis of the amounts of print color material of black determined in the step d) and the input colorimetric values, and determining the obtained amounts of print color materials as the amounts of print color materials of cyan, magenta, and yellow.

When colorimetric values defined in the CIE $L^*a^*b^*$ or CIE $L^*u^*v^*$ space in a uniform color space are supplied, a plurality of sets of the amounts of print color materials of cyan, magenta, and yellow can be obtained from these colorimetric values and a plurality of sets of the amounts of print color material of black. The range of color material printable for each of the colors, cyan, magenta, and yellow, is calculated from the plurality of sets of the amounts of print color materials of cyan, magenta, and yellow. The common range of the amounts of black material is obtained, which can be used to print each color materials, cyan, magenta, and yellow to reproduce a color. The amount of print color material of black in the range of the amounts of print color material of black is determined on the basis of a predetermined coefficient n. The amounts of print color materials of cyan, magenta, and yellow are determined from the amount of print color material of black and the colorimetric values.

Since three-dimensional colorimetric values represented in a uniform color space can be converted into four-dimensional CMYK values (cyan, magenta, yellow, and black) as color representation independent of the characteristics of an output unit such as a color printer, the colors to be reproduced can be accurately reproduced by any type of output unit used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a block diagram showing the arrangement of an image reproduction system to which a color material amount determining method of the present invention is applied;

FIG. 2 is a chart showing a look-up table applied to a section for converting colorimetric value to amount of color material in FIG. 1;

DETAILED DESCRIPTION OF THE PREFERRED EMBODIMENT

Figure 3:
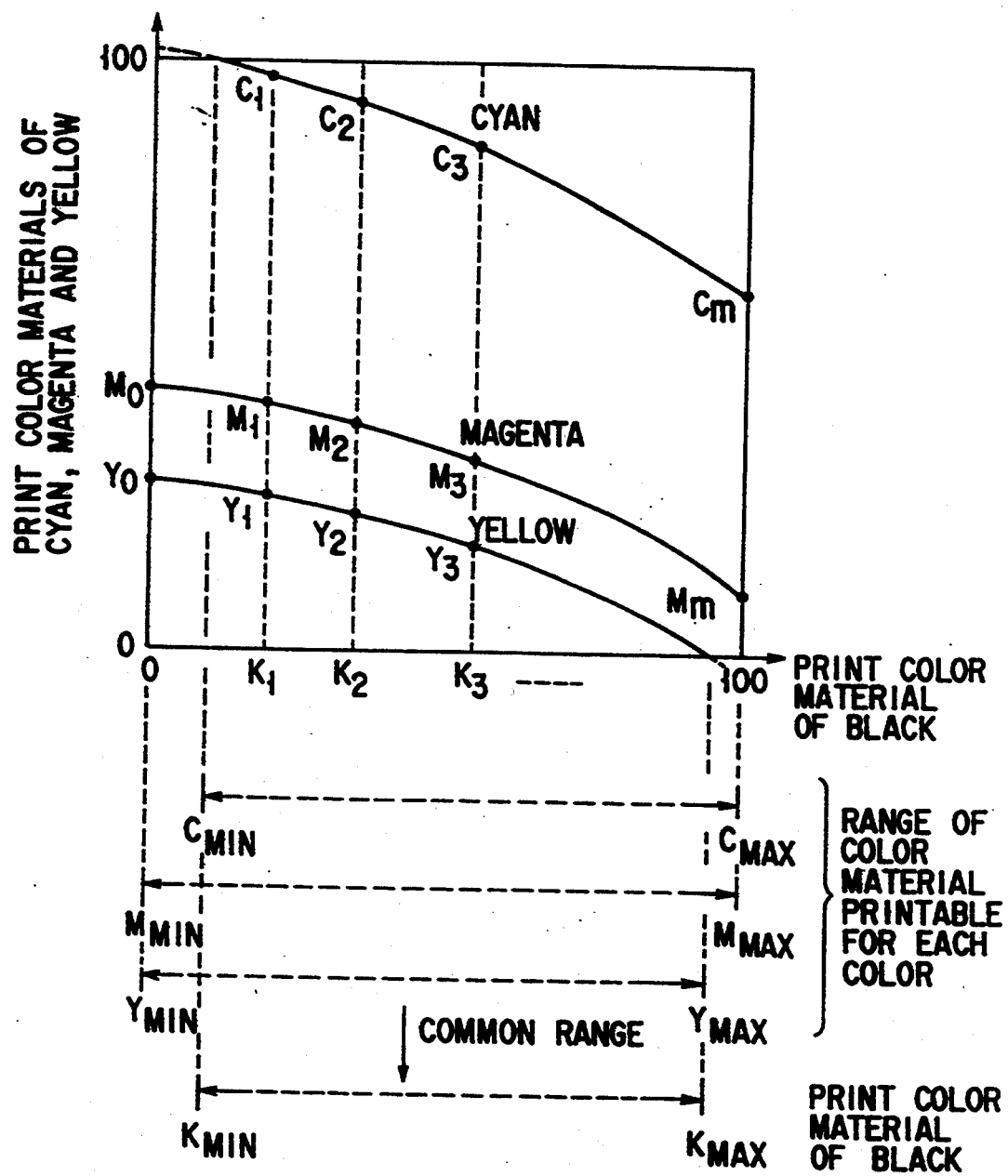
FIG. 3 is a graph showing the relationship between the amounts of printable color materials of cyan, magenta, and yellow and the amount of print color material of black, which are obtained by a section for calculating range of printable color material in FIG. 1 with respect to arbitrary colorimetric values.

An embodiment of the present invention will be described below with reference to the accompanying drawings. In a color representation method, a color value defined in the CIE $L^*a^*b$ or CIE $L^*u^*v^*$ space will be called a colorimetric value hereinafter. Since the CIE $L^*a^*b^*$ or CIE $L^*u^*v^*$ space is a three-dimensional space independent of the characteristics of an output unit such as a color printer or a color copying machine, colorimetric values constitute a three-dimensional point independent of the characteristics of the output unit. In the following embodiment, the CIE $L^*a^*b^*$ space is used as a space for obtaining colorimetric values.

FIG. 1 shows the arrangement of an image reproduction system to which the print color material amount determining method of the present invention is applied. Referring to FIG. 1, this image reproduction system is constituted by a control unit 1, an interface 2, an output unit 3, and a bus 4 for connecting these elements to each other.

The control unit 1 controls the image reproduction system. The control unit 1 receives signals denoting $L^*a^*b^*$ values, which are received via the interface 2, via the bus 4, and calculates CMYK values in consideration of the characteristics of the output unit 3. The control unit 1 then supplies the CMYK values to the output unit 3 via the bus 4. The interface 2 interfaces with an external unit to receive $L^*a^*b^*$ values from the external unit. The output unit 3 performs a color printing operation on the basis of the CMYK values obtained by the control unit 1. As this output unit 3, a color printer, a color copying machine, or the like is used.

As shown in FIG. 1, the control unit 1 is constituted by a section 11 for converting colorimetric value to amount of color material, a section for calculating range of printable color material, a common range calculating section 13, and a section 14 for determining amount of black color material.

The term "amount of color material" means an amount of color material such as printing ink, toner, dye or the like, which adheres onto a substrate such as paper or film. Usually the amount is presented in percentage, i.e., 0% to 100%. An amount of "0%" means that no color material adheres to the substrate. An amount of "100%" means that color material adheres to the substrate prefectly. The amount of color material is represented in various ways, depending on the printing method employed. In offset printing, the amount is converted to dot size. In gravure printing, the amount is converted to the thickness of an ink layer on the substrate. In dye diffusion thermal transfer, the amount is represented in the amount of dye penetrating into the substrate.

In some computerized image processing, an amount of color material ranging from 0% to 100% is converted to a value ranging from 0 to 255.

The section 11 converts colorimetric values defined in the CIE L*a*b* space into CMY values representing the amounts of color materials. In this case, the section 11 uses the amounts ($K_0$ to $K_m$; percentage) of color material of black corresponding to a predetermined division number m, or the amount ($K_p$) of color material of black determined by the section 14. The CMY values ($C_0$, $M_0$, $Y_0$ to $C_m$, $M_m$, $Y_m$) obtained from the L*a*b* values input via the interface 2 and the bus 4 and the amount ($K_0$ to $K_m$) of color material of the black are supplied to the section 12.

The section 11 receives colorimetric values (L*,a*,b*) and amounts of print color material of black $K_0=0$, $K_1$, $K_2$, $K_3$, ... $K_m=100$ (where $K_0<K_1<K_2<K_3< ... <K_m$) obtained by dividing 100% into m parts. Amounts of print color materials of cyan, magenta, and yellow, $C_0$, $M_0$, $Y_0$, $C_1$, $M_1$, $Y_1$, $C_2$, $M_2$, $C_3$, $M_3$, $Y_3$ ... , $C_m$, $M_m$, and $Y_m$ corresponding to the respective amounts of print color material of black are obtained. Theoretically, when printings are performed on the basis of sets of these amounts of color print materials of cyan, magenta, and yellow and the corresponding amounts of print color material of black, the same color can be obtained. That is, the colors of printed matters based on the respective sets ($C_0,M_0,Y_0,0$), ($C_1,M_1,Y_1,K_1$), ($C_2,M_2,Y_2,K_2$), ($C_3,M_3,Y_3,K_3$), ... , ($C_m,M_m,Y_m,100$) are identical to each other.

Furthermore, in this embodiment, an interpolated LUT (look-up table) is applied to the section 11. More specifically, the section 11 includes a table like the one shown in FIG. 2. The LUT shown in FIG. 2 is obtained by performing colorimetry of 14,641 colors using a spectrophotometer, which are printed by the output unit 3 changing the amount (percentage) of color materials of cyan, magenta, yellow, and black at a rate of 10% and by calculating the relationship between colorimetric values and amounts of color materials. Note that colorimetric values L* fall within the range between 0 and 100; colorimetric values a* between −100 and 100; and colorimetric values b* between −100 and 100 at an interval of 10. That is, 53361 (L*·a*·b*·K=11·21·21·11) data representing the relationship between L*a*b* values and the amounts of color materials of CMYK are stored in the LUT.

The section 11 calculates CMY values by using this LUT and 16 elements around the input colorimetric values L*, a*, b*, and K. Assume that L*=72, a*=13, b*=37, and K=55 are input to the section 11. In this case, the section 11 calculates CMY values using the following 16 elements in the LUT:

(L*=70, a*=10, b*=30, K=50)
(L*=70, a*=10, b*=30, K=60)
(L*=70, a*=10, b*=40, K=50)
(L*=70, a*=10, b*=40, K=60)
(L*=70, a*=20, b*=30, K=50)
(L*=70, a*=20, b*=30, K=60)
(L*=70, a*=20, b*=40, K=50)
(L*=70, a*=20, b*=40, K=60)
(L*=80, a*=10, b*=30, K=50)
(L*=80, a*=10, b*=30, K=60)
(L*=80, a*=10, b*=40, K=50)
(L*=80, a*=10, b*=40, K=60)
(L*=80, a*=20, b*=30, K=50)
(L*=80, a*=20, b*=30, K=60)
(L*=80, a*=20, b*=40, K=50)
(L*=80, a*=20, b*=40, K=60)

If, for example, the division number m of black is set to "2", the section 11 calculates CMY values {($C_0,M_0,Y_0$) ($C_1,M_1,Y_1$), ($C_2,M_2,Y_2$)} by this calculation method using L*a*b* values input via the interface 2 and the bus 4 and $K_0=0$, $K_1=50$, $K_2=100$, and outputs the values to the section 12. Note that colors printed on the basis of sets ($C_0,M_0,Y_0,K_0=0$), ($C_1,M_1,Y_1,K_1=50$), and ($C_2,M_2,Y_2,K_2=100$) are identical to each other.

The section 12 calculates the range of a color material printable for each of the colors, i.e., cyan, magenta, and yellow, on the basis of CMY values corresponding to the respective amounts ($K_0$ to $K_m$) of color material of black supplied from the section 11. This calculation is performed by using a spline function or the like, and the ranges of color materials printable for cyan, magenta, and yellow are displayed by using the amounts of color material of black.

Assume that the division number m of black is "2", as described above. In this case, three sets of CMY values ($C_0,M_0,Y_0$), ($C_1,M_1,Y_1$), and ($C_2,M_2,Y_2$) obtained by the section 11 are input to the section 12. When the range of a color material printable for cyan is to be calculated, the section 12 obtains a quadratic function which passes ($C_0$,0), ($C_1$,50), and ($C_2$,100), as follows:

$$\alpha C^2 + \beta C + C_0 \qquad (1)$$

for $$\alpha = (C_0 - 2C_1 + C_2)/5000$$

$$\beta = (-3C_0 + 4C_1 - C_2)/100$$

The range of C in which quadratic expression (1) takes a value which is equal to or more than 0 and is equal to or less than 100 is given as follows:

$$C_{MIN} \leq C \leq C_{MAX}$$

for $C_{MIN}$ is larger one of $\{-\beta - (\beta^2 - 4\alpha C_0)^{\frac{1}{2}}\}/2\alpha$ and 0, and $C_{MAX}$ is a small one of $\{-\beta + (\beta^2 - 4\alpha C_0)^{\frac{1}{2}}\}/2\alpha$ and 100.

In this manner, the section 12 obtains the range ($C_{MIN}$ to $C_{MAX}$) of color material printable for cyan. The section 12 can also obtain the ranges ($M_{MIN}$ to $M_{MAX}$, $Y_{MIN}$ to $Y_{MAX}$) of color materials printable for magenta and yellow in the same manner as described above.

In the above calculation method, ranges are obtained by using three sets of CMY values. However, for example, if three or more sets of CMY values are used, the ranges of color materials printable for cyan, magenta, and yellow can be calculated by using a spline function instead of quadratic function.

FIG. 3 shows the relationship between the amounts of color material of black input to the section 11 and the amounts of print color materials of cyan, magenta, and yellow calculated in accordance therewith, together with the ranges of color materials printable for cyan, magenta, and yellow obtained by the section 12. Note that FIG. 3 shows the result of section 12 using the values of print color materials from section 11, in the case of some $L^*a^*b^*$ value, under the condition division number m is "4". That is, in the graph shown in FIG. 3, colors printed using any amount of print color material of black and the amounts of print color materials of cyan, magenta, and yellow corresponding to the amount of print color material of black are theoretically identical to each other.

Consider cyan. As shown in FIG. 3, cyan takes a value larger than 100 when $K=0$. In practice, since printing cannot be performed with a value larger than 100, the amount of print color material of cyan which can be printed by the output unit 3 takes a value larger than 0 in black color material amount.

Consider yellow. Similarly, when $K=100$, yellow takes a value not more than 0, i.e., a negative value. Therefore, the amount of yellow color material which can be printed by the output unit 3 takes a value not more than 100 in black color material amount.

The common range calculating section 13 calculates the range ($K_{MIN}$ to $K_{MAX}$) of the amounts of print color material of black in which cyan, magenta, and yellow can be printed, on the basis of the calculation result obtained by the section 12. This range of the amounts of black color material is the color material amount range of black ink in which the amount of print color material of each of the colors, cyan, magenta, and yellow, neither exceeds 100% nor becomes a negative amount, and image reproduction can be faithfully performed on the basis of given colorimetric values. The lower part in FIG. 3 shows the relationship between the ranges of color materials printable for the respective colors corresponding to colorimetric values supplied to the control unit 1, which ranges are obtained by the section 12, and the range of black color material obtained by the common range calculating section 13.

Note that if there is no common color material amount of black ink for image reproduction, it indicates that colorimetric values supplied to the control unit 1 exceed the printable range in which image reproduction can be performed by the output unit 3. In this case, therefore, the saturation of a color represented by each colorimetric value needs to be decreased, or the lightness of a color represented by each colorimetric value needs to be decreased/increased so as to make each colorimetric value fall within the printable range of the output unit 3.

The section 14 determines the optimal amount ($K_p$) of black color material in the range ($K_{MIN}$ to $K_{MAX}$) of the amounts of black color material, which is calculated by the common range calculating section 13. The amount $K_p$ of black color material is obtained by multiplying a predetermined black substitution coefficient n ($0 \leq n \leq 1$) and $K_{MAX}$. If, however, the product of $K_{MAX}$ and the black substitution coefficient n is smaller than $K_{MIN}$, $K_{MIN}$ is used as the amount $K_p$ of black color material.

The black substitution coefficient n is determined in accordance with the printing principle and characteristics of the output unit 3. In case UCR (Under Color Removal) is desirable to reduce the total amounts of inks (including all cyan, magenta, yellow, and black inks) printed on printed matter or to print achromatic color stably using mainly black ink, the substitution coefficient n is brought near "1". In contrast to this, when color materials of cyan, magenta, and yellow are to be mainly used, the substitution coefficient n may be brought near "0".

The amount $K_p$ of black color material determined by the section 14 is supplied to the section 11 to be treated as input data again together with colorimetric values supplied to the control unit 1 so as to be used for the calculation of the optimal amounts ($C_p, M_p, Y_p$) of print color materials of cyan, magenta, and yellow.

The control unit 1 is constituted by the above-described components, i.e., the section 11 for converting colorimetric value to amount of color material, the section 12 for calculating range of printable color material, the common range calculating section 13, and the section 14 for determining amount of black color material.

Figure 4:
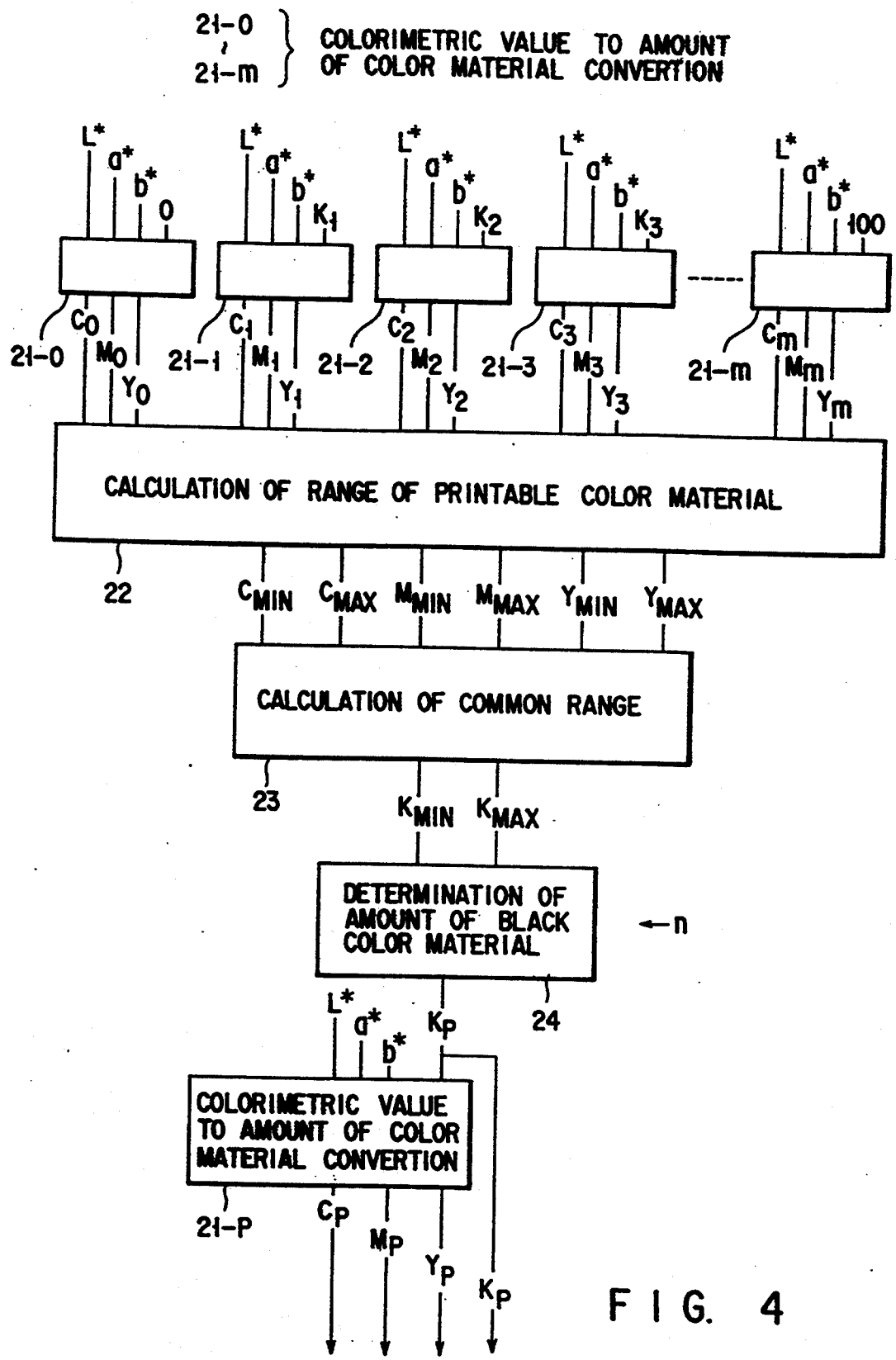
FIG. 4 is a block diagram showing the operation principle of the present invention.

The operation principle of the print color material amount determining method of the present invention will be briefly described next with reference to FIG. 4. Colors to be reproduced are represented by colorimetric values defined in the CIE $L^*a^*b^*$ or CIE $L^*u^*v$ space in a uniform color space. Assume that colors to be reproduced are represented by $L^*a^*b^*$ values defined in the $L^*a^*b^*$ space. When arbitrary colorimetric values to be reproduced are supplied, (m+1) sets of CMY values (cyan, magenta, and yellow) are calculated by using the colorimetric values ($L^*, a^*, b^*$) and the amounts (0 to 100%) of black color material which are obtained in advance by dividing 100% into m parts. In this case, processing is performed in consideration of the characteristics of an output unit (a color printer, a color copying machine, or the like) to be used.

If the m amounts of black color material are given by $K_0=0$, $K_1$, $K_2$, $K_3$, ..., $K_m=100$, $C_0$, $M_0$, and $Y_0$ are calculated by "colorimetric value to amount of color material conversion" 21-0 using $L^*$, $a^*$, $b^*$, and $K_0=0$ as input data. Similarly, $C_1$, $M_1$, and $Y_1$ are calculated by "colorimetric value to amount of color material conversion" 21-1 using $L^*$, $a^*$, $b^*$, and $K_1$ as input data and $C_2$, $M_2$, and $Y_2$ are calculated by "colorimetric value to amount of color material conversion" 21-2 using $L^*$, $a^*$, $b^*$, and $K_2$ as input data. Finally, $C_m$, $M_m$, and $Y_m$ are calculated by "colorimetric value to amount of color material conversion" 21-m using $L^*$, $a^*$, $b^*$, and $K_m$ as input data. All sets of the calculated CMY values and the amounts of black color material, i.e., ($C_0,M_0,Y_0,K_0$), ($C_1,M_1,Y_1,K_1$), ..., ($C_m,M_m,Y_m,K_m$) represent the same color. That is, the same color can be obtained upon image reproduction.

The calculated CMY values are used for "calculation of range of printable color material" 22 to obtain the range of color material printable for each of the colors, cyan, magenta, and yellow. That is, the ranges of color materials printable for the respective colors, cyan, magenta, and yellow, are obtained by "calculation of range of printable color material" 22 in correspondence with the amounts of black color material shown in FIG. 3. The ranges of the respective color materials, i.e., cyan ($C_{MIN}$ to $C_{MAX}$), magenta ($M_{MIN}$ to $M_{MAX}$), and yellow ($Y_{MIN}$ to $Y_{MAX}$), are expressed by the amounts (0 to 100%) of black color material.

Subsequently, "calculation of common range" 23 is performed with respect to the calculated ranges of the respective printable color materials. With this processing, the color material amount range of black ink in which the colors to be reproduced can be reproduced without making each of the color materials of cyan, magenta, and yellow exceed 100% and become a negative value.

After this processing, "determination of amount of black color material" 24 is performed on the basis of this range ($K_{MIN}$ to $K_{MAX}$) of the amounts of black color material. In this case, a predetermined black substitution coefficient n is used. A black substitution coefficient can be determined depending on the printing principle and characteristic of a printer, the type of material to be used, and the purpose of adjustment for a better reproduced image for the eyes of the user. In "determination of amount of black color material" 24, the product of $K_{MAX}$ and n is compared with $K_{MIN}$. If the product is larger than $K_{MIN}$, the product is determined as the optimal amount $K_p$ of black color material. If the product is not more than $K_{MIN}$, $K_{MIN}$ is determined as the optimal amount $K_p$ of black color material. "Colorimetric value to amount of color material conversion" 21-p is performed by using the amount $K_p$ of color material as input data together with the colorimetric values ($L^*,a^*,b^*$). With this processing, CMY values ($C_p,M_p,Y_p$) are calculated. The calculated $C_p$, $M_p$, $Y_p$, and $K_p$ are the optimal CMY values for faithful reproduction of the colors to be reproduced by the output unit.

Figure 5:
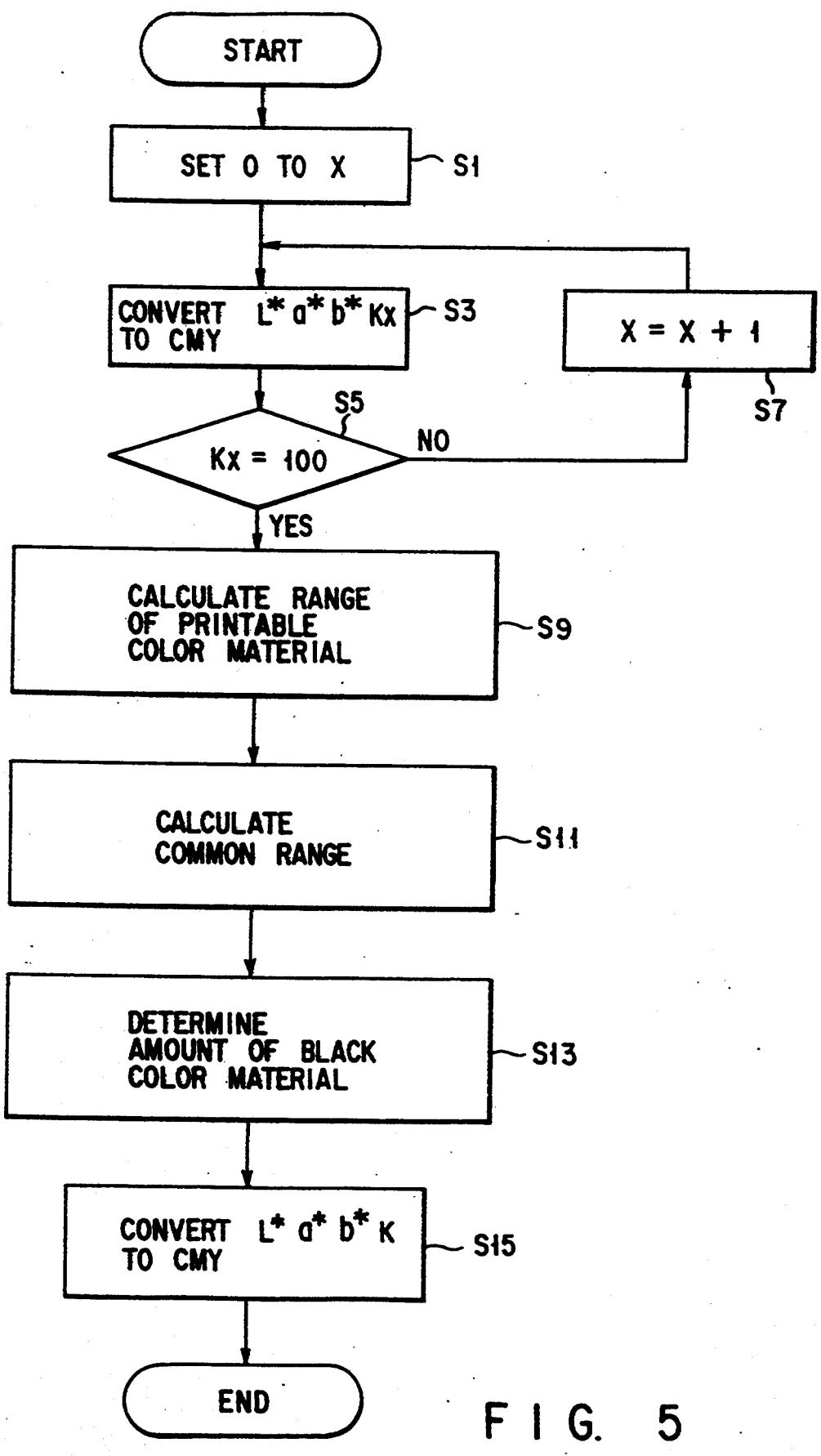
FIG. 5 is a flow chart showing the operation of a control unit in FIG. 1.

The operation of the control unit 1 of the image reproduction system shown in FIG. 1 will be described next with reference to FIG. 5.

A division number m (m>2) is predetermined. According to the division number m, an amount $K_x$ ($K_0 \leq K_x \leq K_m = 100$) is obtained.

In step S1, "0" is set to a parameter X. When $L^*$, $a^*$, and $b^*$ values corresponding to colors to be reproduced are input to the control unit 1 via the interface 2 and the bus 4, CMY values are calculated by the section 11 using the $L^*$, $a^*$, and $b^*$ values and an amount $K_0$ of black color material as input data (step S1 and S3). Note that the amount $K_0$ of black color material is equal to 0%. Conversion to the CMY values ($L^*a^*b^*$ values / CMY values conversion) is performed by using the interpolated LUT method. Subsequently, it is checked whether the amount $K_x$ ($K_x = K_0$) of black color material used for the calculation of the CMY values is 100% (step S5).

If the amount $K_x$ of black color material used for the conversion to the CMY values is not 100% (NO in step S5), a new amount $K_1$ ($K_{0+1}$) of black color material is obtained (step S7). Thereafter, conversion processing is performed again in the section 11. By the loop processing in steps S3 to S7, the amount $K_x$ of black color material is increased from $K_0$ to $K_m$. The same processing is performed until $K_m = 100$ and the colorimetric value to amount of color material conversion is completed on the basis of this amount of print color material.

If the amount $K_x$ of black color material used for the calculation of the CMY values is 100% (YES in step S5), the section 12 obtains the range of color material printable for each of the colors, cyan, magenta, and yellow in color reproduction (step S9). Note that if YES in step S5, conversion processing (CMY value calculation processing) has already been performed by the section 11 (m+1) times. That is, (m+1) sets of the amounts of print color materials of cyan, magenta, yellow, and black, i.e., ($C_0,M_0,Y_0,K_0$) to ($C_m,M_m,Y_m,K_m$), used for the reproduction of the colors to be reproduced by the output unit 3 have already been obtained. The section 12 calculates the ranges of color materials for cyan, magenta, yellow, and black from these (m+1) sets of the amounts of print color materials of cyan, magenta, yellow, and black by using a spline function or the like (note that FIG. 3 shows the relationship between the amounts of color materials of cyan, magenta, and yellow and the amount of color material of black). The ranges of the respective printable color materials, i.e., cyan ($C_{MIN}$ to $C_{MAX}$), magenta ($M_{MIN}$ to $M_{MAX}$), and yellow ($Y_{MIN}$ to $Y_{MAX}$), are represented by using the amounts (0 to 100%) of black color material. The calculated values $C_{MIN}$, $C_{MAX}$, $M_{MIN}$, $M_{MAX}$, $Y_{MIN}$, and $Y_{MAX}$ are supplied to the common range calculating section 13. The common range calculating section 13 calculates the range ($K_{MIN}$ to $K_{MAX}$) of the amounts of black color material in which the colors supplied to the control unit 1 can be reproduced without making the amount of color material of each of the colors, cyan, magenta, and yellow, exceed 100% and become a negative value, on the basis of the maximum and minimum values ($C_{MIN}$, $C_{MAX}$, $M_{MIN}$, $M_{MAX}$, $Y_{MIN}$, and $Y_{MAX}$) of the input ranges of the amounts of the respective color materials (step S11). The calculated print color materials $K_{MIN}$ and $K_{MAX}$ are supplied to the section 14.

Subsequently, the section 14 determines the optimal amount $K_p$ of black color material on the basis of the input print color material amounts $K_{MIN}$ and $K_{MAX}$ (step S13). The section 14 multiplies $K_{MAX}$ by the black substitution coefficient n, and compares the product with $K_{MIN}$. If the product is larger than $K_{MIN}$, the product is determined as the amount $K_p$ of black color material. If the product is smaller than $K_{MIN}$, $K_{MIN}$ is determined as the product $K_p$ of black color material. The black substitution coefficient n used in this case is a predetermined value, which is determined depending on the printing principle and characteristics of the output unit 3 and application purposes, as described above. The determined amount $K_p$ of black color material is supplied to the section 11.

Upon reception of the amount $K_p$ of black color material from the section 14, the section 11 executes CMY value conversion processing again by using the previously input colorimetric values ($L^*,a^*,b^*$) (step S15). The CMY values ($C_p,M_p,Y_p$) obtained by this colorimetric value to amount of color material conversion are supplied to the output unit 3 together with the amount $K_p$ of black color material.

The output unit 3 performs color reproduction processing (color printing) on the basis of the CMYK values ($C_p,M_p,Y_p,K_p$) supplied from the control unit 1.

As has been described in detail above, according to the present invention, three-dimensional colorimetric values represented by color expressions based on a uniform color space can be converted into four-dimensional CMYK values (cyan, magenta, yellow, and black) that is independent of an output unit such as a color printer. Therefore, colors to be reproduced can be accurately reproduced by any type of output unit used.

In the above embodiment, L*a*b* values defined in the CIE L*a*b* space in a uniform color space are used to represent color. However, L*u*v* values defined in the CIE L*u*v* space may be used.

Figure 6:
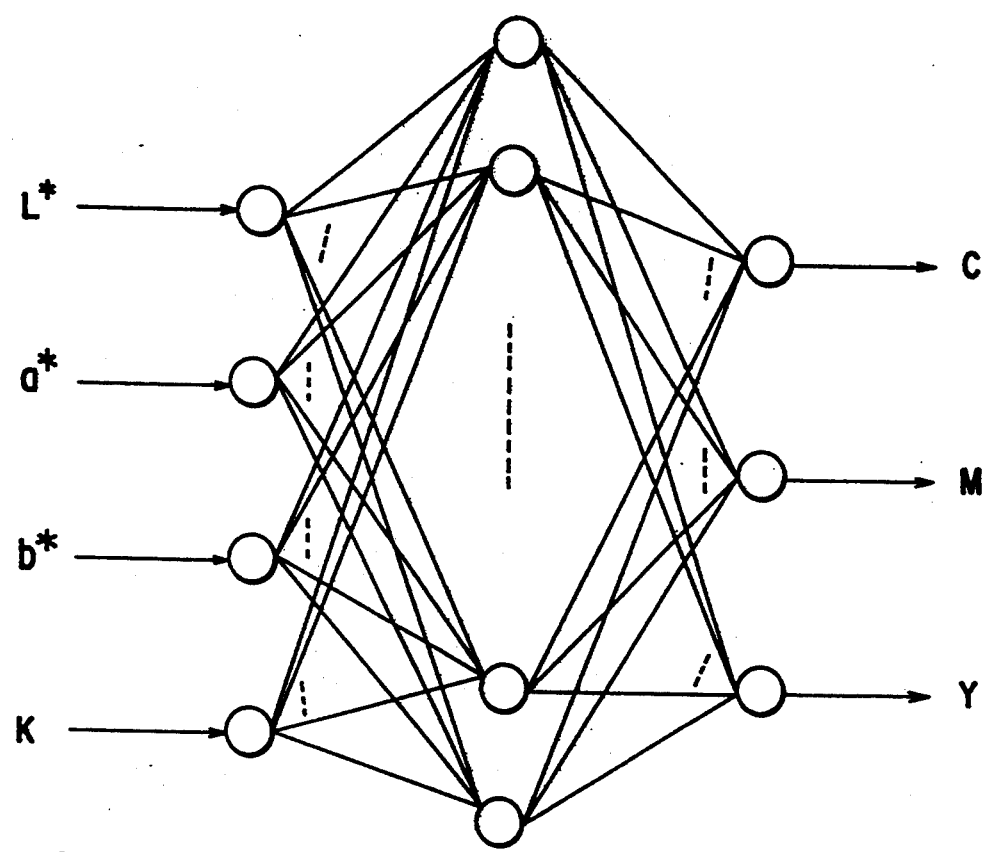
FIG. 6 is a view showing a case wherein a neural network is applied to the section for converting colorimetric value to amount of color material in FIG. 1.

In addition, in this embodiment, the interpolated look-up table (LUT) is applied to the section 11 for converting colorimetric value to amount of color material. However, the present invention is not limited to this. For example, a neural network like the one shown in FIG. 6 may be used. The neural network shown in FIG. 6 is a three-layered back propagation neural network. The intermediate layer of this neural network is constituted by 9 to 20 neurons. The neural network has undergone a learning process to consider the characteristics of an output unit.

Furthermore, the least squares method may be applied to the section 11. In this case, an equation for satisfying the relationship between 14,641 sets of the amounts of color materials of cyan, magenta, yellow, and black and corresponding L*a*b* or CIE L*u*v* values is set for each of the colors, cyan, magenta, and yellow. For cyan, $r_0, r_1, \ldots$ are set to satisfy the 14,641 sets of color materials of cyan and black, L* values, a* values, and b* values in the following equation:

$$\begin{aligned} C &= f(L^*, a^*, b^*, K) \\ &= r_0 \cdot L^* + r_1 \cdot a^* + r_2 \cdot b^* + r_3 \cdot K + \\ &\quad r_4 \cdot L^{*2} + r_5 \cdot a^{*2} + r_6 \cdot b^{*2} + r_7 \cdot K^2 \ldots \end{aligned}$$

Similarly, for magenta and yellow, the above values are set to satisfy the following equations:

$$M = g(L^*, a^*, b^*, K)$$

$$Y = h(L^*, a^*, b^*, K)$$

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of converting colorimetric values defined in a uniform color space into the amounts of print color materials of cyan, magenta, yellow, and black, comprising the steps of:
   a) converting the amounts of black color material and the colorimetric values to m sets of print color materials of cyan, magenta, and yellow on the basis of predetermined m (1<m) amounts of print color material of black;
   b) calculating a range of print color material of each of cyan, magenta, and yellow in which the amount of print color material of each of cyan, magenta, and yellow is not less than 0% and not more than 100%, on the basis of the m sets of print color materials of cyan, magenta, and yellow obtained in the step a);
   c) obtaining a common range of the amounts of print color material of black from the range of print color material of each of cyan, magenta, and yellow calculated in the step b);
   d) multiplying a maximum value in the common range of the amounts of print color material of black by a predetermined coefficient n ($0 \leq n \leq 1$), determining the product as the amount of print color material of black if the product is larger than a minimum value in the range of the amounts of print color material of black, and determining the minimum value as the amount of print color material of black if the product is smaller than the minimum value; and
   e) converting the amount of print color material of black obtained in the step d) and the colorimetric values into the amounts of print color materials of cyan, magenta, and yellow, and determining the obtained amounts of color materials of the respective colors as the amounts of print color materials of cyan, magenta, and yellow.

2. A method according to claim 1, wherein the steps a) and b) comprise performing conversion by using an interpolated look-up table method.

3. A method according to claim 1, wherein the steps a) and e) comprise performing conversion by using a neural network.

4. A method according to claim 1, wherein the steps a) and e) comprise performing conversion by using a least squares method.

5. A method according to claim 1, wherein in the step a), the m amounts of print color material of black include at least 0% and 100%.

6. A method according to claim 1, wherein the step b) comprises calculating the range of print color material of each color by using a spline function.

7. A method according to claim 1, wherein the colorimetric values are defined in a CIE L*a*b* space.

8. A method according to claim 1, wherein the colorimetric values are defined in a CIE L*u*v* space.

9. A print color material amount determining method used for an image reproduction system, having an output unit for outputting colors on the basis of the amounts of print color materials of cyan, magenta, yellow, and black and conversion means for converting colorimetric values defined in a uniform color space and the amounts of print color material of black into the amounts of print color materials of cyan, magenta, and yellow, for reproducing colors represented by the colorimetric values by using said output unit, comprising the steps of:
   a) obtaining m sets of print color materials of cyan, magenta, and yellow by using said conversion means on the basis of predetermined m (1<m) amounts of print color material of black in response to input of colorimetric values to said image reproduction system;
   b) calculating a range of print color material of each of cyan, magenta, and yellow in which the amount of print color material of each of cyan, magenta, and yellow is not less than 0% and not more than 100%, on the basis of the m sets of print color materials of cyan, magenta, and yellow obtained in the step a);
   c) obtaining a common range of the amounts of print color material of black from the range of print color material of each of cyan, magenta, and yellow calculated in the step b);

d) multiplying a maximum value in the common range of the amounts of print color material of black by a predetermined coefficient n ($0 \leq n \leq 1$), determining the product as the amount of print color material of black if the product is larger than a minimum value in the range of the amounts of print color material of black, and determining the minimum value as the amount of print color material of black if the product is smaller than the minimum value; and e) obtaining the amounts of print color materials of cyan, magenta, and yellow by using said conversion means on the basis of the amounts of print color material of black determined in the step d) and the input colorimetric values, and determining the obtained amounts of print color materials as the amounts of print color materials of cyan, magenta, and yellow.

10. A method according to claim 9, wherein said conversion means uses an interpolated look-up table method.

11. A method according to claim 9, wherein said conversion means uses a neural network.

12. A method according to claim 9, wherein said conversion means uses a least squares method.

13. A method according to claim 9, wherein in the step a), the predetermined m amounts of print color material of black include at least 0% and 100%.

14. A method according to claim 9, wherein the step b) comprises calculating the range of print color material of each color by using a spline function.

15. A method according to claim 9, wherein the colorimetric values are defined in the CIE L*a*b* space.

16. A method according to claim 9, wherein the colorimetric values are defined in a CIE L*u*v* space.

* * * * *